(No Model.)

L. WARSTLER & A. C. PONTIUS.
PAVEMENT.

No. 333,576. Patented Jan. 5, 1886.

WITNESSES:
E. G. Lane
Harry Frease

INVENTOR
L. Warstler
A. C. Pontius

BY
Fred W. Bond
ATTORNEY

UNITED STATES PATENT OFFICE.

LEVI WARSTLER AND ALBERT C. PONTIUS, OF LOUISVILLE, OHIO.

PAVEMENT.

SPECIFICATION forming part of Letters Patent No. 333,576, dated January 5, 1886.

Application filed June 15, 1885. Serial No. 168,805. (No model.)

*To all whom it may concern:*

Be it known that we, LEVI WARSTLER and ALBERT C. PONTIUS, citizens of the United States, residing at Louisville, in the county of Stark and State of Ohio, have invented certain new and useful Improvements in Pavements; and we do hereby declare that the following is a full, clear, and exact description of the same, reference being had to the annexed drawings, making a part of this specification, and to the letters and figures of reference marked thereon, in which—

Figure 1:
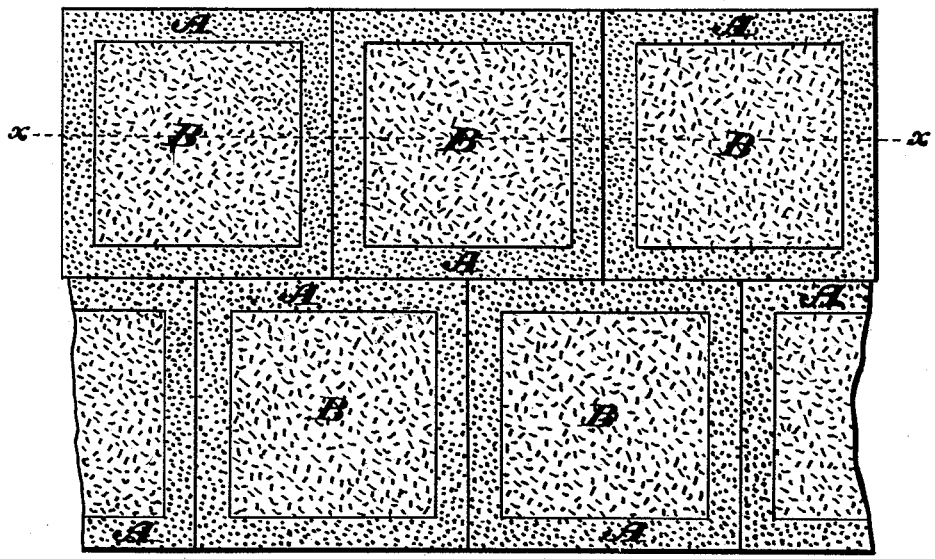
Figure 2:
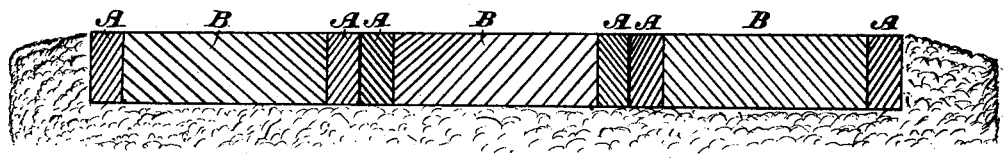

Figure 1 is a top view. Fig. 2 is a transverse section on line $x\,x$, Fig. 1.

The present invention has relation to the manufacture and construction of pavements; and its nature consists in the different parts and combination of parts hereinafter described, and particularly pointed out in the claims.

In the accompanying drawings similar letters indicate corresponding parts in each figure.

In the accompanying drawings, A represents the shell or casing of the pavement proper, and is a part thereof, and, as shown in the drawings, is formed square; but we do not desire to be confined to any particular form, except so far as to have the shells or casings so formed that their faces will fully join each other when properly placed in a pavement, as shown in Fig. 1, so as to leave no interstices between the faces of the shells or casings A. The shells or casings A are made of such material that they will become partially vitrified when properly hardened by burning in a kiln, and may be of the form and size shown in the drawings. The shells or casings A are filled with cement, artificial stone, or other similar material, B, while in a plastic state, so that when the filling becomes hardened by exposure said filling and the shell or casing will become a solid block.

In using the above-described block the cementitious filling may be colored different colors, thus giving a pleasing effect to the character and appearance of the pavement. The ground upon which the blocks are placed is prepared by placing gravel or light material upon the surface in the ordinary manner of preparing ground for pavements. It will be seen that by forming the faces of the shells or casings A so that their faces will fully join each other they will be securely held in proper position. The shells being filled with the plastic composition prior to laying the pavement, we are enabled to subject the composition to powerful compression in the shells, and thereby provide composite paving-blocks which can be used to construct a pavement at any time with little labor. We have discovered by experience that by introducing the plastic composition into the vitrified or burned shells and then subjecting the composition to powerful compression—say from fifteen hundred to two thousand pounds—we obtain great condensation of the material and freedom from air-holes and other deficiencies, thereby making a better resisting substance for the purposes sought. Where hollow blocks are first laid and then filled with a composition, but little pressure can be brought to bear on the latter, as it must be effected by hand labor. The exposure to air and water greatly facilitates the hardening process of the plastic filling, and consequently the longer the shells are filled prior to their being laid the more durable and efficient they become in resisting the wear and tear of traffic. By filling the shells prior to laying them, and compressing the fillings therein, the composite blocks can be handled with great facility, and the necessity of preparing and carrying the plastic composition in the process of laying the pavement is entirely avoided, the paving-blocks constituting our invention being prepared complete before leaving the factory.

Having now fully described our invention, what we claim as new, and desire to secure by Letters Patent, is—

1. A composite paving-block consisting in the combination of a vitrified or burned shell and a plastic composition compressed and hardened in the shell prior to laying the latter, substantially as described.

2. A pavement consisting of vitrified or burned angular shells arranged with the whole of their surrounding walls in direct contact with each other, and plastic composition compressed and hardened in the shells, substantially as described.

In testimony that we claim the above we have hereunto subscribed our names in the presence of two witnesses.

LEVI WARSTLER.
ALBERT C. PONTIUS.

Witnesses:
HARRY FREASE,
FRED W. BOND.